United States Patent
Shi et al.

(10) Patent No.: US 11,172,561 B2
(45) Date of Patent: Nov. 9, 2021

(54) MICROWAVE SENSOR DEVICE, AND SENSING METHODS, AND LIGHTING SYSTEM USING THE SENSOR DEVICE

(71) Applicant: SIGNIFY HOLDING B.V., Eindhoven (NL)

(72) Inventors: Liang Shi, Shanghai (CN); Rang Jian Ding, Shanghai (CN); Gang Wang, Shanghai (CN); Shoaib Khan, Eindhoven (NL); Fetze Pijlman, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/268,563

(22) PCT Filed: Jul. 31, 2019

(86) PCT No.: PCT/EP2019/070581
§ 371 (c)(1),
(2) Date: Feb. 15, 2021

(87) PCT Pub. No.: WO2020/035314
PCT Pub. Date: Feb. 20, 2020

(65) Prior Publication Data
US 2021/0168920 A1 Jun. 3, 2021

(30) Foreign Application Priority Data

Aug. 14, 2018 (WO) ................ PCT/CN2018/010044
Nov. 5, 2018 (EP) ..................................... 18204390

(51) Int. Cl.
*H05B 47/115* (2020.01)
*H05B 47/19* (2020.01)
(Continued)

(52) U.S. Cl.
CPC ............ *H05B 47/115* (2020.01); *G01S 17/50* (2013.01); *G01S 17/86* (2020.01); *H05B 47/155* (2020.01); *H05B 47/19* (2020.01)

(58) Field of Classification Search
CPC .... H05B 47/115; H05B 47/19; H05B 47/155; G01S 17/86; G01S 17/50; H04B 17/318; H04W 4/02; H04W 4/029; H04W 4/80
See application file for complete search history.

(56) References Cited

U.S. PATENT DOCUMENTS 7,123,145 B2 * 10/2006 Reilly ..................... G01S 13/56
340/552
9,474,042 B1 * 10/2016 Wootton ................. H04W 4/33
(Continued)

FOREIGN PATENT DOCUMENTS

EP       2214032 A1    8/2010
EP       2373128 A2    10/2011
(Continued)

*Primary Examiner* — Alexander H Taningco
*Assistant Examiner* — Pedro C Fernandez (57) ABSTRACT

A microwave sensor device is for detecting activity and for sending and/or receiving a communications signal to/from a second microwave sensor device. A microwave transceiver is used for transmitting a microwave transmit signal and for receiving a microwave receive signal. For motion detection, the microwave receive signal is a reflected version of the microwave transmit signal and the signals are processed to identify first signal characteristics. For communication, the microwave transmit signal is a communications signal for detection at another sensor device. The transmit and microwave receive signals are processed to identify second characteristics. This sensor device detects motion and also transmits and/or receives a communications signal using the same transceiver. In particular, the communications signal is designed to be detected by a remote sensor device in the same way as for motion detection.

15 Claims, 6 Drawing Sheets

(51) Int. Cl.
  *G01S 17/86* (2020.01)
  *H05B 47/155* (2020.01)
  *G01S 17/50* (2006.01)

(56) References Cited

U.S. PATENT DOCUMENTS

| | | | | |
|---|---|---|---|---|
| 9,986,623 | B1* | 5/2018 | Miu | H05B 45/10 |
| 10,109,167 | B1* | 10/2018 | Olekas | G08B 13/24 |
| 2014/0119160 | A1* | 5/2014 | Shilling | G01S 7/521 |
| | | | | 367/93 |
| 2015/0326680 | A1* | 11/2015 | Farahani | G06Q 30/02 |
| | | | | 706/12 |
| 2016/0294492 | A1* | 10/2016 | Mostofi | H04B 17/318 |
| 2017/0350969 | A1 | 12/2017 | Pandharipande et al. | |

FOREIGN PATENT DOCUMENTS

| | | | |
|---|---|---|---|
| WO | 2012023087 | A1 | 2/2012 |
| WO | 2014033618 | A1 | 3/2014 |

* cited by examiner

MICROWAVE SENSOR DEVICE, AND SENSING METHODS, AND LIGHTING SYSTEM USING THE SENSOR DEVICE

CROSS-REFERENCE TO PRIOR APPLICATIONS

This application is the U.S. National Phase application under 35 U.S.C. § 371 of International Application No. PCT/EP2019/070581, filed on Jul. 31, 2019, which claims the benefit of International Patent Application No. PCT/CN2018/100440, filed on Aug. 14, 2018 and European Patent Application No. 18204390.1, filed on Nov. 5, 2018. These applications are hereby incorporated by reference herein.

FIELD OF THE INVENTION

This invention relates to microwave sensor devices, for example for presence and movement detection. Such detection may then be used to control other devices, such as luminaires of a lighting system.

BACKGROUND OF THE INVENTION

There is a trend in the lighting industry for lighting devices to become interconnected by the internet of things (IoT) so that functions may be implemented based on communication between lighting devices. One of the key elements of a smart lighting system is sensor integration.

Lighting devices are well known with infrared PIR sensors for motion, and hence presence, detection. An alternative which is becoming increasingly popular is the use of a microwave sensor. This type of sensor may be more sensitive and it is also able to function through a lighting device lens, thus enabling more compact integration of the sensor into a lighting device.

There are advantages to sensor integration even for a standalone device. For example, a standalone device with an occupancy sensor is popular for saving power when appropriate. However, a connected system of smart lighting devices gives the option for high end control features.

For example, a simple smart road lighting system requires basic interaction between the lighting devices. When one of the lighting devices detects activity of a target object (such as a car or pedestrian) it needs to communicate with several other devices ahead to implement a view further ahead of the target objects. Typically, an extra RF communications system is required to realize this basic communication function. This increases the system cost and complexity.

It has been proposed to make reuse of the presence detector to implement the communication between devices. One example is disclosed in WO2014/033618A1, in which presence detectors are integrated with lighting devices. The presence detector uses a first signal frequency for activity detection, and uses a second sweeping frequency with respect to its frequency for signal for communication. The presence detector however requires two monitoring units; one for activity detection and one for communication reception. Thus, the solution provides a simplification of the hardware required but there is still a need for a more simple implementation.

SUMMARY OF THE INVENTION

The invention is defined by the claims.

It is a concept of the invention to use the same microwave transmission and reception hardware for activity (e.g. motion or presence) detection as for signal communication (sending and/or receiving). This is achieved by providing a communications signal from a first sensor device to a second sensor device which mimics an activity detection signal at that second sensor device. Thus the second sensor device has little modification and existing devices can be reused.

According to a set of examples in accordance with a first aspect of the invention, there is provided a first microwave sensor device for detecting activity and for sending a communications signal to a second microwave sensor device, comprising:

a microwave transceiver for transmitting a microwave transmit signal and for receiving a microwave receive signal which is a reflection of the microwave transmit signal;

a detector for processing the microwave transmit signal and the microwave receive signal thereby to detect activity based on a first characteristic difference between the microwave transmit signal and the microwave receive signal; and a control unit to control the microwave transceiver to transmit a communications signal for detection at the second microwave sensor device, said communication signal (T1$b$) being with a second characteristic difference with respect to a characteristic of a microwave transmit signal of the second microwave sensor device, which second characteristic difference is adapted to be detected by the second microwave sensor device so as to be aware of the communication.

This sensor device detects an activity such as motion and also generates a communications signal using the same transceiver. In particular, the communications signal is designed to be detected by the second sensor device in the same way as for motion detection at that second sensor device. The second characteristics may for example be thought of as identifying an artificial activity signal (whereas the first and second sensor devices are preferably positionally fixed relative to each other). This artificial activity signal has a characteristic difference with respect to the transmit signal of the second sensor device. The artificial activity signal for example has a frequency shift with respect to the microwave transmit signal of the second sensor. This means the reception of the communications signal at the second sensor device also takes place with the same transceiver, since it is detected in the same way as a activity signal since the characteristic difference is inherently identifiable by the second sensor device. Thus, the overall hardware required to implement communication (transmission and reception) is simplified.

The control unit may be adapted to transmit the microwave communications signal in response to the detection of movement as the activity, and said communications signals is adapted to mimic the microwave transmit signal of the second microwave sensor device reflected by a moving object, by having the second characteristic difference equal to the characteristic variation of the characteristic of the microwave transmit signal of the second microwave sensor device caused by the moving object.

The communications signal is for example used to alert adjacent sensor units to the presence of an approaching moving object, so that action may be taken in advance, such as providing lighting in an area approached by the moving object. An advantage of this mimicking is that the second microwave sensor has minimum adaption, if any, to be able to communicate with the first microwave sensor, since the first microwave sensor already mimics the moving object.

Alternatively, the second characteristic difference is outside the range of the characteristic variation of the characteristic of the microwave transmit signal of the second microwave sensor device caused by the moving object. This embodiment has an advantage that the original sensing function of moving object in the second microwave sensor device is not interfered.

The first and second characteristic differences may each comprise a frequency difference, and the control unit is adapted to transmit the communications signal with a frequency having a frequency difference with respect to the frequency of the microwave transmit signal of the second microwave sensor device, wherein the second frequency difference is equal to the frequency variation of the frequency of the microwave transmit signal of the second microwave sensor device caused by the moving object due to Doppler effect. Frequency difference is one parameter in common Doppler effect-based detection, thus by providing a communications signal with a frequency difference from the second sensor device, the second sensor device is able to detect this frequency difference and deem it is a motion based on the Doppler effect.

Note that other activities can also be applicable, such as detection of the presence of an object. For example in received signal strength indication (RSSI) based detection, the variance of a signal strength is used for detecting the presence of a new object. The first sensor device in another embodiment of the invention can provide a varied signal strength in order to mimic the presence of a new object.

Even further, the phase shift of a signal can also be mimicked in case that phase shift is used for detection at the second sensor device. There are still other embodiments of the characteristic difference.

Also the first and the second characteristic difference can be of the same type, for example both may be a frequency difference, or the characteristic differences can be different. For example, the first characteristic difference may be a frequency difference whereas the second characteristic difference is a phase difference. When they are differences of the same characteristic type, the value/amplitude of the difference can also be the same or different.

For the example of a frequency difference, the control unit may be adapted to transmit the communications signal with a fixed frequency difference or with a dynamic pattern of frequency difference. A fixed frequency difference is simple for the second sensor device to detect. A dynamic pattern can embed more information or even a digital communications signal, thus is robust and efficient.

The control unit is for example adapted to transmit a microwave transmit signal with a first frequency characteristic during a first time period for the detection of activity, and to transmit the communications signal with a second characteristic (e.g. based on a dynamic frequency) during a second time period.

The sensor device thus operates a time division approach, with the activity detection using a static microwave transmit signal at one time, and with the communication using a microwave transmit signal at another time. Note that in a more advanced embodiment, the transceiver can also be able to send the transmit signal and the communications signal at the same time.

The sensor device may be further for receiving a communications signal from a third microwave sensor device, wherein the detector is adapted to process the communications signal from the third microwave sensor device and the microwave transmit signal of the first sensor device to thereby to determine activity based on a third characteristic difference between the microwave transmit signal of the first microwave sensor and the communications signal from the third microwave sensor device.

The first sensor device is thus able to be triggered by communications signals from a third sensor device, besides by a real movement of a real object. As mentioned above, the reception uses the same transceiver, since the communications signal has the characteristics of a particular activity (e.g. movement) profile.

The microwave receive signal is a reflected version of the microwave transmit signal in the case of activity detection, whereas it is a microwave communications signal from another sensor device in the case of receiving a communication.

According to a set of examples in accordance with a second aspect of the invention, there is provided a second microwave sensor device for detecting activity and for receiving a communications signal from a first microwave sensor device, comprising:

a microwave transceiver for transmitting a microwave transmit signal and for receiving a microwave receive signal which is a reflection of the microwave transmit signal; and a detector to process the microwave transmit signal and the microwave receive signal to detect activity based on a first characteristic difference of the microwave transmit signal and the microwave receive signal, wherein said microwave transceiver is further for receiving a communications signal from the first microwave sensor device and the detector is further adapted to determine activity based on a second characteristic difference of the microwave transmit signal of the second microwave sensor device and the communications signal of the first microwave sensor device.

As explained above, the second characteristic difference is either the same or different from the first characteristic difference.

This defines a sensor device with the ability to receive the communications signal from the sensor device defined above (i.e. the one which generates the communications signal). Characteristic differences of the microwave transmit signal and the communications signal correspond to activity detection reflections.

Wherein the frequency difference between the transmit microwave signal and the communications signal is equal to the frequency variation of the frequency of the microwave transmit signal of the second microwave sensor device caused by a moving object. The communication is interpreted by determining activity hence using the same approach as for activity detection, because the communications signal mimics an activity (e.g. motion) by mimicking the reflected transmit signal of the second sensor device. Thus, a received communications signal with particular characteristics indicates detection of activity.

Alternatively, the frequency difference is outside the range of the frequency variation of the frequency of the microwave transmit signal of the second microwave sensor device caused by the moving object. In this embodiment, the communication does not interfere the original sensing of moving object in the second microwave sensor device.

In both aspects, the first and the second characteristic differences comprise frequency differences, and the detector is adapted to detect the frequency difference from the transmit microwave signal and the receive microwave signal, and the frequency difference from the transmit microwave signal and the communications signal.

Frequency difference is usually used in Doppler effect-based motion detection, like microwave/radar sensor.

A simple mixer may be used to implement homodyne mixing to derive the signal properties, corresponding to the first and second characteristics.

The second characteristic difference is either a fixed frequency difference or a dynamic pattern of frequency difference. The fixed frequency difference is simple for detection.

The dynamic pattern for example may be a frequency sweep of the microwave receive signal which crosses a static frequency of the microwave transmit signal.

A frequency sweep creates an identifiable and unique pattern in the frequency difference components. Furthermore, due to the static positions of the sensors, the microwave receive signal may have constant amplitude, which further distinguishes over the signals reflected by real moving objects. In one example, the first sensor may mimic a constant frequency shift and in a second example it may mimic an unnatural frequency shift. For the first case, a conventional second sensor can be used, whereas for the second case the second sensor is adapted to detect the unnatural shift.

When a dynamic pattern of frequency difference is employed, it may comprise an increasing frequency sweep over time which represents a first communication symbol value and a decreasing frequency sweep over time which represents a second communication symbol value.

In this way, the communications signal may be formed as a word of bits/symbols, where each bit/symbol takes a value which depends on the direction of the frequency sweep. Thus, information may be encoded in the communications signal as a data stream.

The detector for example generates orthogonal I and Q intermediate frequency signals. The use of two orthogonal components enables the positive and negative frequency sweeps to be distinguished from each other.

The microwave transceiver (of the second sensor device) may be adapted to transmit a further communications signal to a next microwave sensor device in order to spread the communications signal from the first microwave sensor device, wherein said further communications signal is for detection at the next microwave sensor device to form a third characteristic difference between the further communications signal and a microwave transmit signal of the next microwave sensor device.

In this way, a communications signal is propagated along a series chain of sensor devices. Preferably, the communications signal is propagated until a certain distance of spreading has been reached. This provides a finite distance of activity/motion trigger.

The invention also provides a first luminaire, comprising:
a lamp; and
a first sensor device as defined above,
wherein the luminaire is adapted to send a communications signal to one or more adjacent luminaires, wherein the communications signal relates to activity detection information at the luminaire.

This luminaire is able to send information to other luminaires when it detects local activity. In this way, a series of luminaires may be controlled automatically in response to objects moving through different illumination areas.

The invention also provides a second luminaire, comprising:
a lamp; and
a second sensor device as defined above,
wherein the luminaire is adapted to receive a communications signal from one or more adjacent luminaries, wherein the communications signal relates to activity detection information at the adjacent luminaire.

The invention also provides a lighting system comprising:
a plurality of luminaires comprising at least a first luminaire as defined above and at least a second luminaire as defined above,
wherein the second luminaire is adapted to receive a communications signal from an adjacent first luminaire, wherein the communications signal relates to activity detection information.

This defines a network of communicating luminaires.

The first aspect of the invention also provides a method of detecting activity at a first microwave sensor device and sending a communications signal to a second microwave sensor device, comprising:
transmitting a microwave transmit signal and receiving a microwave receive signal;
for activity detection at the first microwave sensor device, processing the microwave transmit signal and the microwave receive signal and to detect activity based on a first characteristic difference of the microwave transmit signal and the microwave receive signal; and
for communicating with the second microwave sensor device, controlling the microwave transceiver to transmit a communications signal for detection at the second microwave sensor device, said communications signal having a second characteristic difference with respect to a characteristic of a microwave transmit signal of the second microwave sensor device, which second characteristic difference is adapted to be detected by the second microwave sensor device so as to be aware of the communication.

The method may further comprise receiving a communications signal from a third microwave sensor device, wherein the detector is adapted to process the communications signal from the third microwave sensor device and the microwave transmit signal of the first sensor device to thereby to determine activity based on a third characteristic difference between the microwave transmit signal and the communications signal from the third microwave sensor device.

The second aspect of the invention also provides a method of detecting activity at a second microwave sensor device and receiving a communication from a first microwave sensor device, comprising:
at the second microwave sensor device, transmitting a microwave transmit signal and receiving a microwave receive signal which is a reflection of the microwave transmit signal;
for activity detection at the second microwave sensor device, processing the microwave transmit signal and the microwave receive signal thereby to detect activity based on a first characteristic difference of the microwave transmit signal and the microwave receive signal;
for receiving a communication from the first microwave sensor device, determining communication based on a second characteristic difference of the microwave transmit signal and a received communications signal.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a microwave sensor device for detecting activity and for sending and/or receiving a communications signal to/from a second microwave sensor device. A microwave transceiver is used for transmitting a microwave transmit signal and for receiving a microwave receive signal. For activity detection such as motion detection, the microwave receive signal is a reflected version of the microwave transmit signal and the signals are processed to identify a first signal characteristic difference. For communication, the communications signal is for detection at another sensor device. The communications signal and a microwave transmit signal of the another sensor device are processed at the another sensor device to identify a second characteristic difference. This sensor device detects activity such as motion and also transmits and/or receives a communications signal using the same transceiver. In particular, the communications signal is designed to be detected by a remote sensor device in the same way as for activity (e.g. motion) detection.

The invention will be described with reference to motion detection specifically even though, as mentioned above, the same principles apply to presence detection or object detection more generally.

The basic principle of operation of a microwave sensor is to measure Doppler frequency shifts. Wave fronts transmitted by a microwave generator hit a moving target. Depending on the direction of the motion of this target, the wave fronts are either compressed or expanded, which results in a shift in frequency. The signal, shifted in frequency and reflected, is subtracted from the original unchanged microwave transmit signal in a relatively simple homodyne mixer, to result in a sinusoidal intermediate frequency (IF). This is well known in traditional sensor devices.

If sensor devices are close to each other (for example as may be the case for adjacent lighting units with integrated motion sensing functionality), the microwave signal sent by one device may be received by an adjacent device. The microwave sensor transmit signal for example has a propagation distance of several tens of meters.

Known systems attempt to prevent this interference, since it could damage the motion detection function. For example, it may be ensured that within a system, the sensors are sufficiently far apart from each other, or in different areas between which microwave transmission is blocked (e.g. by walls). Alternatively, adjacent microwave sensors may be provided with a different transceiver frequency.

This invention is based on making use of this interference between sensor devices. If the two microwave sensor devices have close enough frequency (e.g. within kHz), the second sensor will receive the signal from first sensor and amplify the intermediate frequency signal (IF) for processing. By setting the signal from the first sensor such that it resembles a reflected signal of the transmit signal of the second sensor, the second sensor would also detect a frequency shift and determines that there is a moving object reflecting this signal, thus a motion will be considered to have been sensed.

Figure 1:
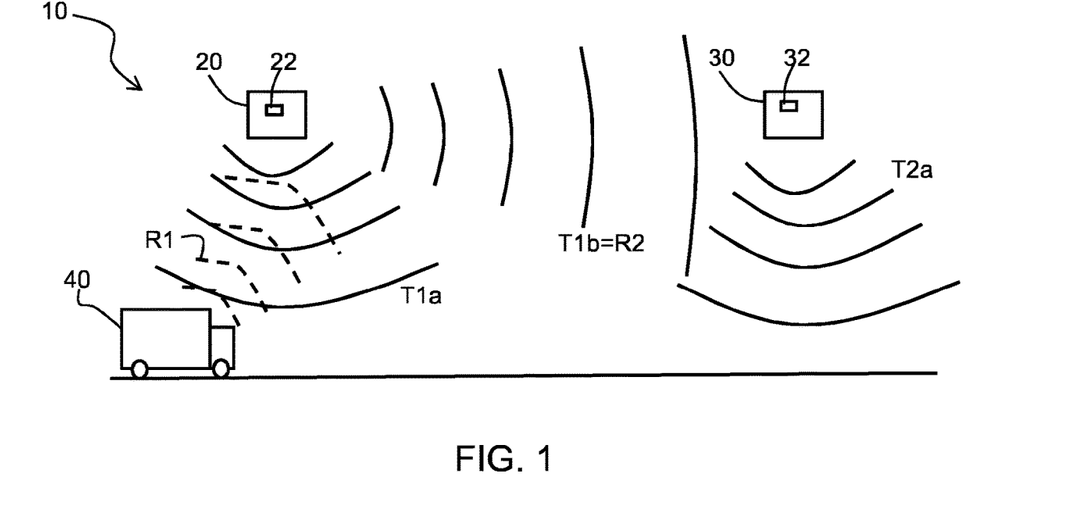
FIG. 1 shows the basic principle of operation of the system of the invention, used as part of a road lighting system by way of example.

FIG. 1 shows the basic principle of operation of the system of the invention, used as part of a road lighting system by way of example. Note that other applications like indoor lighting are also possible.

The road lighting system 10 comprises a series of luminaires, of which two, 20 and 30, are shown.

A first luminaire 20 has a first microwave sensor device 22 for detecting motion and for sending a communications signal to a second microwave sensor device 32 at the second luminaire 30.

The microwave sensor device 22 transmits a microwave transmit signal T1a and receives a microwave receive signal R1 which is a reflection of the microwave transmit signal T1a for example from a moving van 40. Movement is detected based on a first characteristic difference between the microwave transmit signal T1a and the microwave receive signal R1. Preferably the first characteristic difference is frequency difference/shift between the two microwave signals. This is suitable for conventional and well-known Doppler effect-based motion detection. The well-known Doppler detection will not be described further.

Upon a detection of the moving object, the microwave transceiver of the sensor device 22 is also controlled to transmit a communications signal T1b for detection at the second microwave sensor device 32. The second microwave sensor device 32 functions in the same way as the first. Thus, it is used to analyze a difference between its own microwave transmit signal T2a and a receive signal. However, for the second microwave sensor device, the communications signal T1b, instead of being a reflected signal from a moving object, functions as the receive signal R2. A second characteristic difference between the communications signal T1b and the microwave transmit signal T2a of the second microwave sensor device is determined. This second characteristic difference encodes a communications signal.

The first sensor device 22 detects motion and also generates a communications signal using the same transceiver. In a simple implementation, the communications signal T1b is detected by the second sensor device 32 in the same way as for motion detection at that second sensor device. Thus, the communications signal mimics the microwave transmit signal of the second microwave sensor device T2a after reflection by a moving object. This means that no adaptation of the detection system in the second sensor device 32 is needed.

The second characteristic difference represents an artificial movement signal. The first and second sensor devices are positionally fixed relative to each other for example at street lighting luminaires, so that the movement signal is artificial in that it is not generated by a Doppler shift.

The second characteristic difference is identifiably either the same or different to the characteristics caused by movement of real objects, such as people or vehicles. The artificial movement signal for example has a fixed frequency shift with respect to the microwave transmit signal T2a of the second sensor or else a varying frequency shift. Because of the fixed distance between the two sensor devices, the received amplitude is constant. This constant amplitude as well as a specific (fixed or dynamic) frequency difference, enables the communications signals to be identified even in when there are additionally reflections from moving objects.

The microwave communications signal T1b may be transmitted in response to the detection of movement. The communications signal is then used to alert adjacent sensor units to the presence of an approaching moving object 40, so that action may be taken in advance, such as providing lighting in an area approached by the moving object. The action may also be something else like doing some preparation in the microwave sensing for the incoming moving object. Most essentially, the communication is implemented between the two microwave sensor devices 22 and 32.

As is clear from the description above, the first and second characteristic differences each comprise a frequency difference, which in turn is representative of a movement in the specific example being described. The communications signal T1b is generated with a frequency such that an identifiable frequency difference is present with respect to the frequency of the microwave transmit signal T2a of the second microwave sensor device 32. This frequency difference (between T2a and R2) may be fixed or it may have a dynamic pattern.

The two microwave sensor devices 22, 32 are preferably the same, i.e. each one is able to transmit a communications signal as explained for microwave sensor device 22 and receive a communications signal as explained for microwave sensor device 32.

In some cases, all communications signals (such as a sweeping frequency) may be identifiable as different to signals from real moving objects. In other cases, the communications signal may not be identifiably different (for example a fixed frequency). However, if the purpose is simply to relay a message that there is a moving object in the vicinity, it does not matter if the signal is from a real moving object or if it a received message that a moving object has been detected at a different location. The action to be performed may be the same, namely to alert all other units within a certain area of the activity detection that has taken place.

Figure 2:
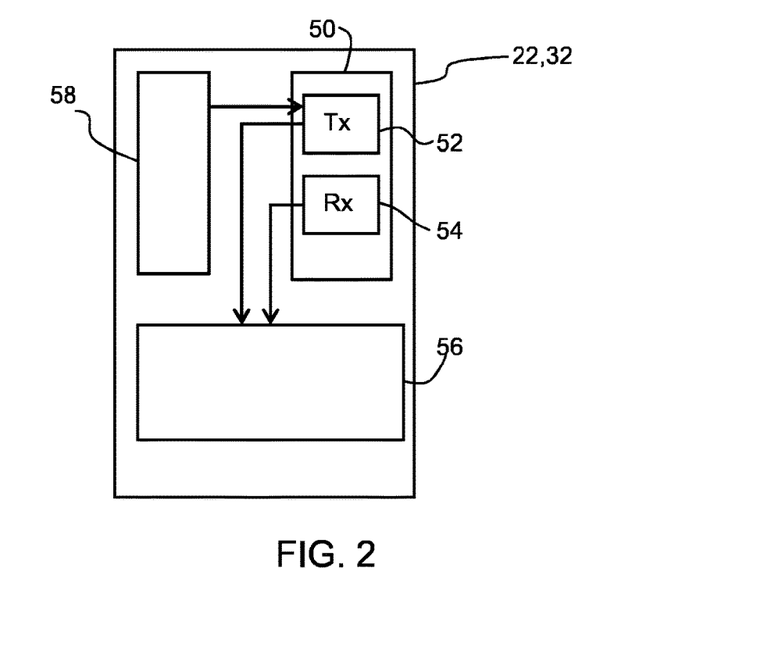
FIG. 2 shows an example of the components of the microwave sensor device.

FIG. 2 shows an example of the components of the microwave sensor device 22, 32.

The device comprises a microwave transceiver 50 having a transmitter 52 for transmitting the microwave transmit signal and a receiver 54 for receiving the receive signal which is either a reflection of the microwave transmit signal or a simulated reflection of the microwave transmit signal (i.e. the communications signal T1b).

A detector 56 processes the microwave transmit signal and the microwave receive signal thereby to detect movement based on the first characteristic difference between the microwave transmit signal and the microwave receive signal. The detector 56 comprises a mixer to implement homodyne mixing to derive the signal properties, corresponding to the first and second characteristics.

A control unit 58 is provided to control the microwave transceiver 50 to transmit the communications signal for detection at the second microwave sensor device, and thereby to form the second characteristic difference as explained above.

The communication between sensor devices is preferably bidirectional, i.e. each adjacent pair of sensor devices can communicate with each other. The moving object (van 40 in FIG. 1) may be traveling in either direction, so one luminaire will need to communicate with the luminaires on either side depending on the direction of approach. Thus, a first luminaire and first sensor device may send a signal to a second luminaire and second sensor device. The second luminaire and second sensor device thus receive a signal from the first luminaire and first sensor device. The first luminaire and first sensor device may send also receive a signal from a third luminaire and third sensor device (which may be the same one as the second luminaire and second sensor device, or it may be a different one).

Figure 3:
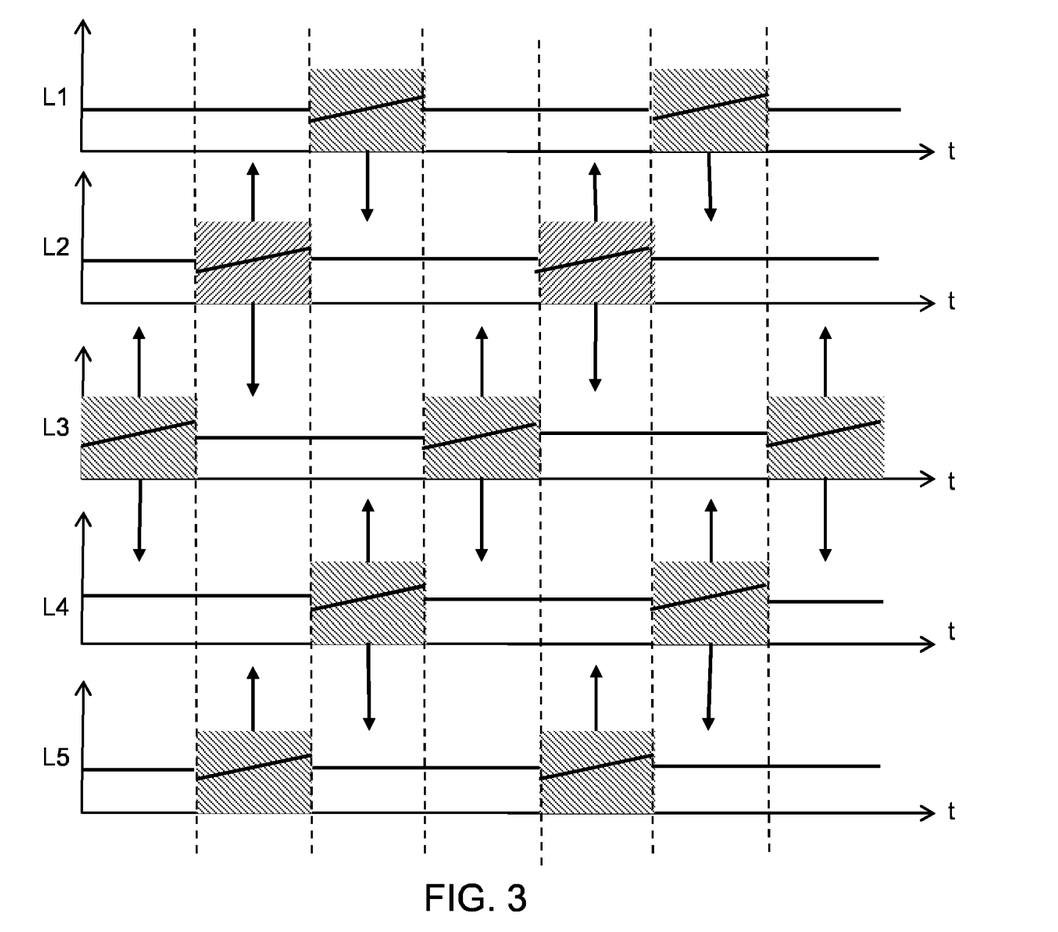
FIG. 3 shows a simple example of a time division approach to explain how communications signals may be sent and received.

A time division approach may be used. FIG. 3 is a simple example to explain how communications signals may be sent and received. It shows a timing diagram for five different luminaires L1 to L5. Each timing diagram shows the output frequency of the sensor. Each luminaire has a period for receiving signals when the output frequency is constant (the flat line) and a period for transmitting a ramp signal (shown in a hatched area). The duration of the receiving time is twice as long as the duration for transmitting. Thus, the receiving occupies two time slots whereas the transmitting occupies one time slot. The time slots are shown separated by dashed lines.

The vertical arrows show that the transmitted signal (sent during the hatched areas) is received at the two neighboring luminaires during their reception time periods. Thus, the transmit time periods are staggered so that when one luminaire is in communications signal transmit mode, the two neighboring luminaires are in receive mode.

There is a repeating sequence for each luminaire of a double receiving time slot and a transmit time slot.

During the receiving time slots, local motion detection takes place, i.e. a first difference characteristic is determined between a transmitted signal T1a and a reflected received signal R1. Communication reception also takes place (if there is a communications signal to receive), i.e. a second difference characteristic is determined between a transmitted signal and a received communications signal (e.g. between T2a and T1b). During the transmit time slot, the communications signal (T1b for the first sensor device) is sent out.

FIG. 3 shows that a transmitted signal may be received by the following luminaire or by the preceding luminaire. If the range of the transmit signal is only to the next or preceding luminaire, only one communications signal is ever received in any individual time slot.

This simple time scheme ensures that a sensor is always ready to receive a transmitted signal from a neighboring sensor.

When one luminaire receives a communications signal, it may transmit a further communications signal to a next luminaire, and hence the next microwave sensor device, in order to spread the communications signal from the first microwave sensor device, preferably until a certain distance of spreading has been reached. The further communications signal is for detection at the next microwave sensor device to form a third characteristic difference (which may be the same or different as the second characteristic difference) between the further communications signal and a microwave transmit signal of the next microwave sensor device. In this way, a communications signal is propagated along a series chain of sensor devices.

FIG. 3 is based on a single type of communications signal, but there may be multiple communications signals used within the system. For example, different sensor devices may employ different communications signals (leading to different characteristic differences) so that each communications signal also itself identifies the source of the signal. This may for example enable one sensor device to send a signal to multiple other devices at the same time, instead of the more simple adjacent communication system shown in FIG. 3.

Figure 4:
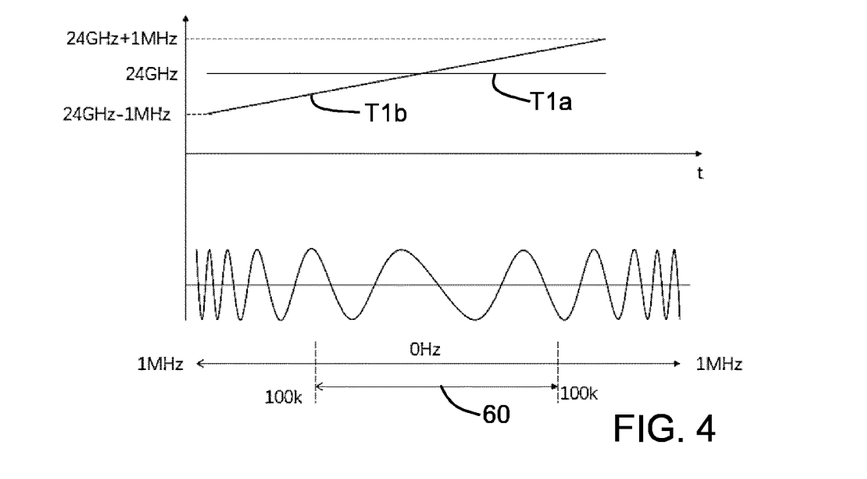
FIG. 4 shows an example of the microwave transmit signal for activity detection and the communications signal.

FIG. 4 shows an example of the microwave transmit signal T1a (for motion detection) with a constant frequency of 24 GHz. The communications signal T1b comprises a frequency sweep from 23 GHz to 25 GHz. The sweep frequency T1b of the first sensor device is to be received by the second sensor device. During the time that the frequency sweep is sent to the second sensor device, it has its transmit frequency fixed as shown in FIG. 3 (the transmit frequency is fixed during times R1 and R2).

If there is there is no moving object detected by the second sensor device, the output relates only to the second characteristic difference, i.e. the difference between the communications signal T1b and the transmit signal T2a. The output frequency is high when the difference is high, and is close to 0 Hz when the two frequencies are equal (i.e. at the crossing point). Since the amplitude of the communications signal T1b is keep stable and the distance between two devices is also stable, the output signal amplitude of the second sensor device is constant with only the frequency changing.

If the maximum deviation between the transmit frequencies of the two sensors is from −1 MHz to 1 MHz, the output signal frequency of the second sensor is also −1 MHz to 1 MHz shown as the bottom plot in FIG. 4. This waveform is processed in the same way as for any other movement pattern (such as a man walking or a car driving) by the existing algorithm. It is noted that for the purposes of limiting the processing requirements, and the filter bandwidths, a signal range 60 between −100 KHz to +100 KHz may be used for signal processing.

Figure 5:
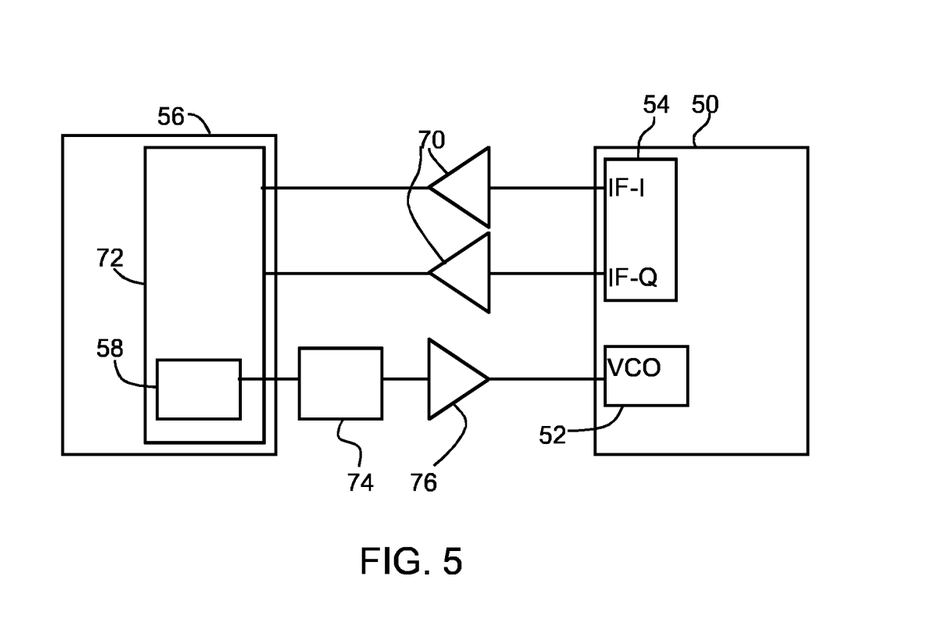
FIG. 5 shows some further details of the sensor device.

FIG. 5 shows some further details of the sensor device.

Based on detecting the difference frequency pattern, the receiving sensor device is able to identify the signal as a communication from an adjacent sensor. The receiver 54 generates quadrature intermediate frequency components IF-I and IF-Q, which are passed through band pass amplifiers 70 to the detector 56 which comprises a signal processor 72. Part of the signal processor 72 implements the control unit 58 by providing a frequency sweep command to the transceiver 50, via a D/A converter 74 and trimming circuit 76. The transmitter 52 comprises a voltage controlled oscillator (VCO) for implementing the frequency sweep.

The frequency trimming range is large (several MHz/V), so a precise trimming circuit such as a voltage divider and DC shift unit is used to enable accurate frequency trimming within a small range.

The use of quadrature sensing signals, with identical signal output but with a phase shift, means the direction of a moving object can be determined (according to the receive frequency changing direction).

Figure 6:
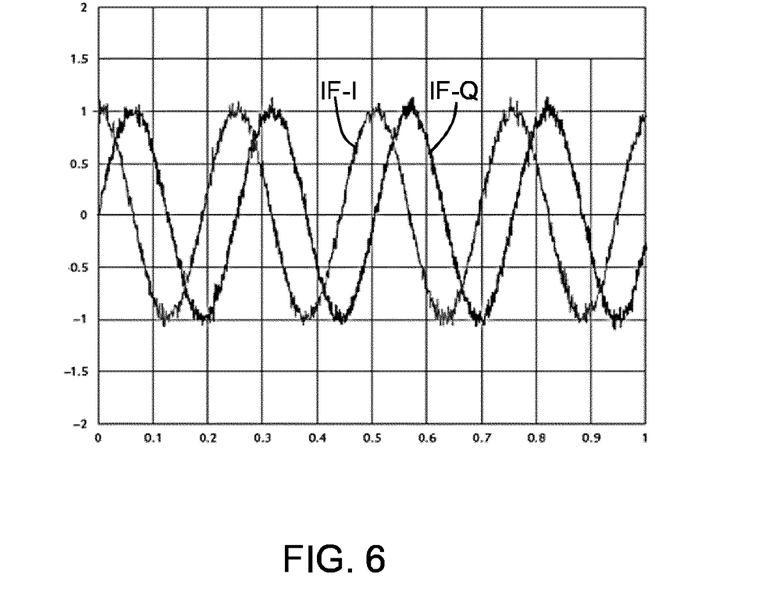
FIG. 6 shows two quadrature intermediate frequency (i.e. difference frequency) signals for a constant frequency difference.

FIG. 6 shows the IF-I and IF-Q signals (versus time) for a constant frequency difference, corresponding to a moving object with constant speed.

In addition, the use of two channels also enables two different communication symbols to be encoded.

Figure 7:
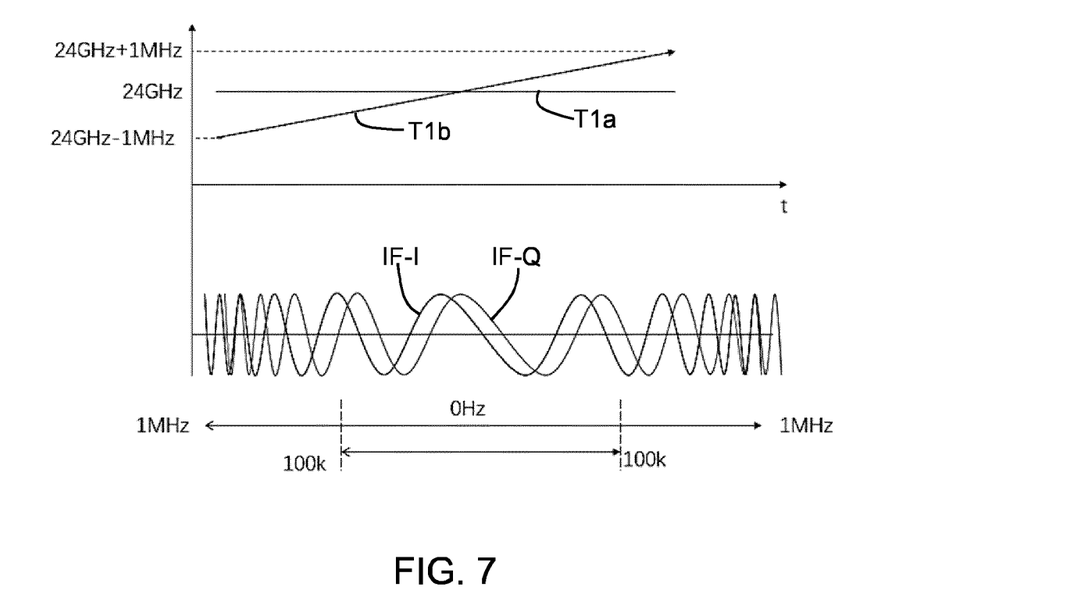
FIG. 7 shows a positive frequency sweep for the communications signal.
Figure 8:
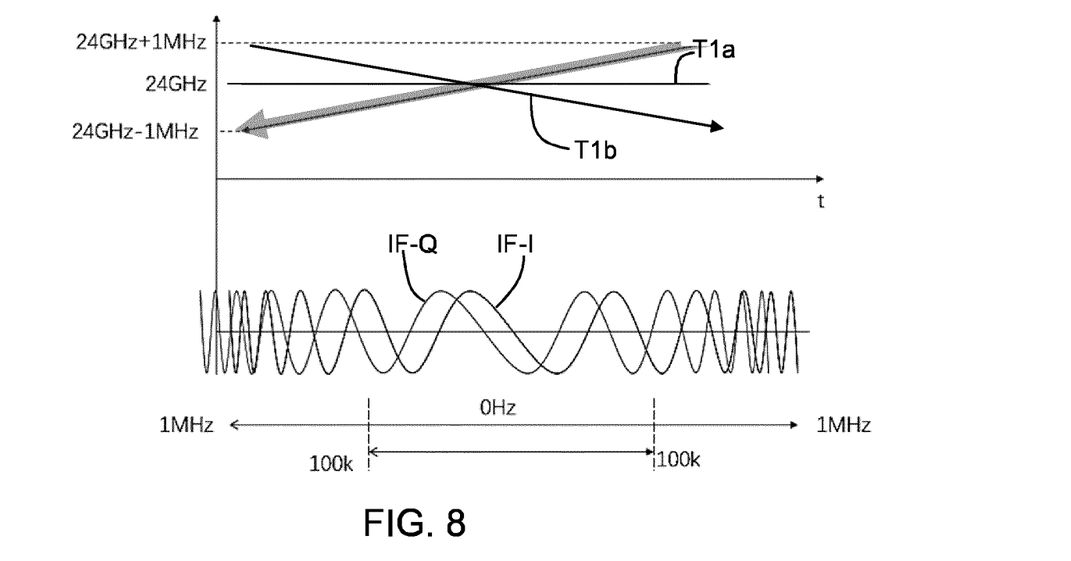
FIG. 8 shows a negative frequency sweep for the communications signal.

FIG. 7 shows a positive frequency sweep for the communications signal T1b and FIG. 8 shows a negative frequency sweep for the communications signal T1b.

This feature provides two distinguishable states for communication, with different directions of sweep frequency. The sensor device receiving the communications signal can identify these two behaviors by the different I and Q channel phase shifts, as can be seen from the bottom plots in FIGS. 7 and 8.

The response in FIG. 7 may be interpreted as a 1 and the behavior shown in FIG. 8 may be interpreted as a 0. Thus, each frequency sweep may encode a single symbol (bit) of data transmission, with several frequency sweep operations enabling a simple data string to be sent out. The data transmission rate is determined by the possible frequency sweeping speed.

The frequency sweep creates an identifiable and unique pattern in the frequency difference components. The reception system is then adapted to recognize the particular pattern. However, the sending (first) sensor may instead mimic a constant frequency shift, i.e. representing a specific Doppler shift. A completely conventional sensor can may be used to detect this and as long as it represents a response which will not arise from a moving object (e.g. because the speed is too high, or the amplitude is too constant), it can be identified as a communications signal.

The invention may be employed generally for communication between sensor devices. However, as explained above, the invention is of particular interest for lighting applications which combine microwave presence/movement sensors and basic communication.

Figure 9:
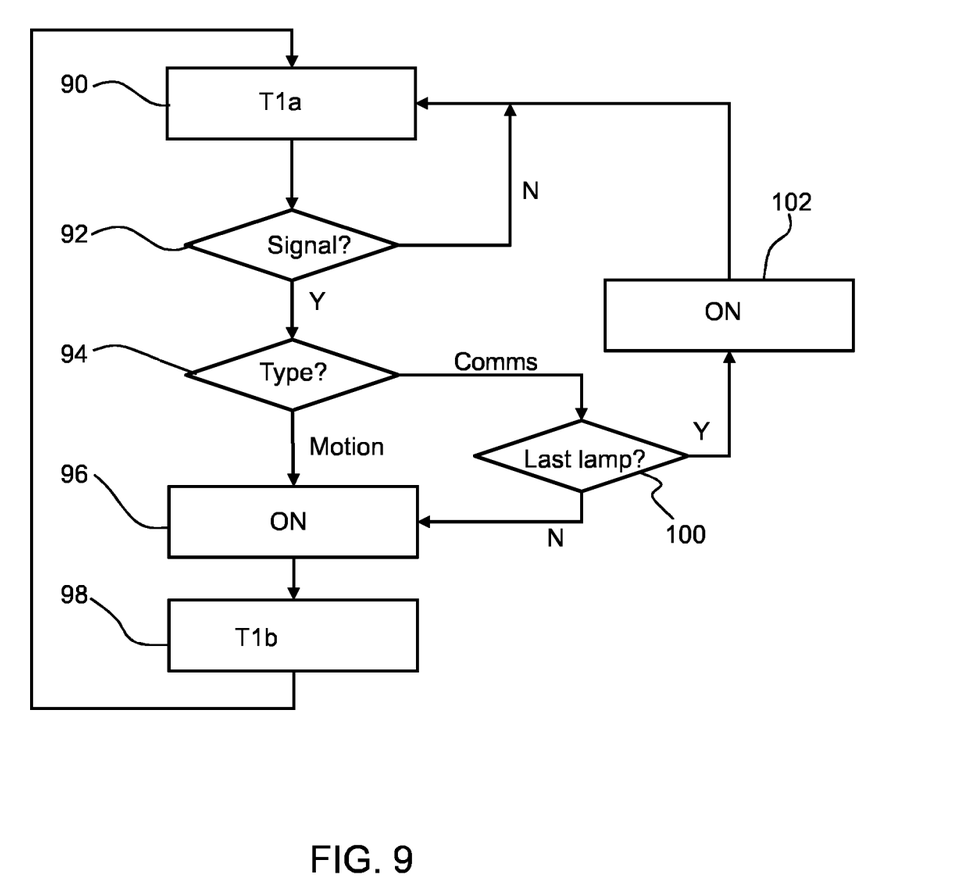
FIG. 9 shows a lighting control method.

FIG. 9 shows a lighting control method. In step 90, a sensor monitoring mode is started in one luminaire.

In step 92 it is determined if a useful sensing signal has been received (i.e. signifying movement or receipt of a communication).

In step 94, the type of received signal is determined. If a movement detection signal is determined, the luminaire lighting unit is turn on in step 96 and a communications signal is sent in step 98 relating to the movement detection and the method returns to step 90.

If a communications signal is determined in step 94, the signal is decoded in step 100, and it is also determined if another message needs to be relayed to a next luminaire (i.e. it is determined if the luminaire is the last one in the series or is the last one which needs to be turned on because it is as the limit of the distance range over which lighting is required). If it is not the last lighting unit to be turned on then the method proceeds to step 96. If it is the last, the lighting unit is turned on in step 102 and the method returns to step 90 (i.e. without the communications step 98).

Figure 10:
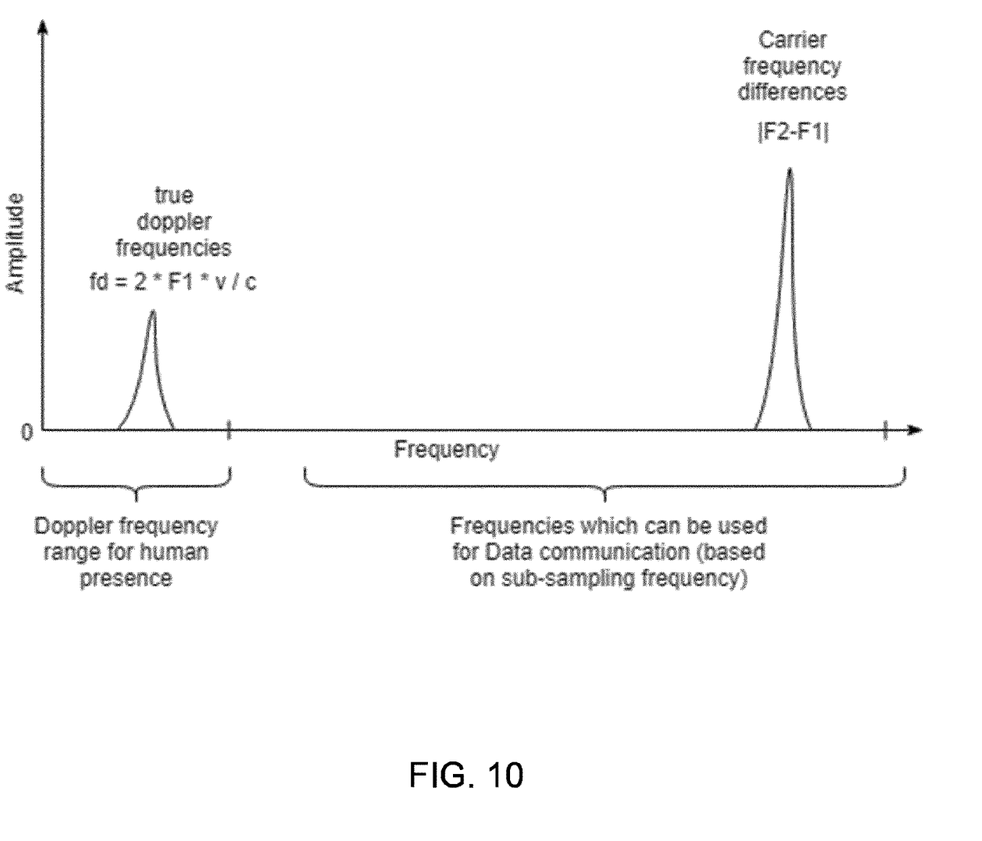
FIG. 10 shows the frequency difference of Doppler effect and for communication.

In the above embodiment, the frequency difference is within/equal to the range of Doppler frequency shift due to moving object. An alternative embodiment is making the frequency difference between the communication signal of the first device and the transmit signal of the second device outside the range of Doppler frequency shift due to moving object. FIG. 10 shows the frequency difference for communication is higher than the normal Doppler shift. This embodiment has an advantage of not disturbing the sensing function of the second device, such that the true motion-doppler signal region is also present as the region of interest to the detection algorithm.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A first microwave sensor device for detecting activity and for sending a communications signal to a second microwave sensor device, comprising:
   a microwave transceiver for transmitting a microwave transmit signal and for receiving a microwave receive signal which is a reflection of the microwave transmit signal
   a detector for processing the microwave transmit signal and the microwave receive signal thereby to detect activity based on a first characteristic difference between the microwave transmit signal and the microwave receive signal; and
   a control unit to control the microwave transceiver to transmit a communications signal, for detection at the second microwave sensor device, said communication signal being with a second characteristic difference with respect to a characteristic of a microwave transmit signal of the second microwave sensor device, which second characteristic difference is adapted to be detected by the second microwave sensor device so as to be aware of the communication,
   wherein said communications signal is adapted to mimic the microwave transmit signal of the second microwave sensor device reflected by a moving object, by having the second characteristic difference equal to the characteristic variation of the characteristic of the microwave transmit signal of the second microwave sensor device caused by the moving object.

2. A first microwave sensor device as claimed in claim 1, wherein the control unit is adapted to transmit the communications signal, in response to the detection of movement as the activity.

3. A first microwave sensor device as claimed in claim 2, wherein the first and second characteristic difference comprises frequency difference, and
   the control unit is adapted to transmit the communications signal with a frequency having a frequency difference with respect to the frequency of the microwave transmit signal of the second microwave sensor device, wherein the second frequency difference is equal to the frequency variation of the frequency of the microwave transmit signal of the second microwave sensor device caused by the moving object due to Doppler effect.

4. A first microwave sensor device as claimed in claim 3, wherein the control unit is adapted to transmit the communications signal:
   with a fixed frequency difference; or
   with a dynamic pattern of frequency difference.

5. A first microwave sensor device as claimed in claim 1, which is further for receiving a communications signal from a third microwave sensor device, wherein the detector is adapted to process the communications signal from the third microwave sensor device and the microwave transmit signal of the first microwave sensor device to thereby to determine activity based on a third characteristic difference between the microwave transmit signal of the first microwave sensor and the communications signal from third microwave sensor device.

6. A first luminaire, comprising:
   a lamp; and
   a first sensor device as claimed in claim 1,
   wherein the luminaire is adapted to send a communications signal to one or more adjacent luminaires, wherein the communications signal relates to activity detection information at the luminaire.

7. A lighting system comprising:
   a plurality of luminaires, comprising at least a first luminaire, as claimed in claim 6 and at least a second luminaire,
   wherein the second luminaire is adapted to receive communications signal from one or more adjacent first luminaires, wherein the communications signal relates to activity detection information.

8. A second microwave sensor device for detecting activity and for receiving a communications signal from a first microwave sensor device, comprising:
   a microwave transceiver for transmitting a microwave transmit signal and for receiving a microwave receive signal which is a reflection of the microwave transmit signal; and
   a detector to process the microwave transmit signal and the microwave receive signal to detect activity based on a first characteristic difference of the microwave transmit signal and the microwave receive signal;
   wherein said microwave transceiver is further for receiving a communications signal from the first microwave sensor device and the detector is further adapted to detect the activity based on a second characteristic difference of the microwave transmit signal of the second microwave sensor device and the received communications signal of the first microwave sensor device;
   wherein said communications signal is adapted to mimic the microwave transmit signal of the second microwave sensor device reflected by a moving object, by having the second characteristic difference equal to the characteristic variation of the characteristic of the microwave transmit signal of the second microwave sensor device caused by the moving object.

9. A second microwave sensor device as claimed in claim 8, wherein the first and the second characteristic difference comprises frequency differences, and
   the detector is adapted to detect the frequency difference from the transmit microwave signal and the receive microwave signal, and the frequency difference from the transmit microwave signal and the communications signal,
   wherein the frequency difference between the transmit microwave signal and the communications signal is equal to the frequency variation of the frequency of the microwave transmit signal of the second microwave sensor device caused by a moving object, such that the communications signal is mimicking the transmit signal of the second microwave sensor device reflected by a moving object.

10. A second microwave sensor device as claimed in claim 9, wherein the frequency difference between the transmit microwave signal and the communications signal is equal to the frequency variation of the frequency of the microwave transmit signal of the second microwave sensor device caused by the moving object due to Doppler effect, and
wherein the second characteristics difference is either:
a fixed frequency difference; or
a dynamic pattern of frequency difference.

11. A second microwave sensor device as claimed in claim 10, wherein the dynamic pattern of frequency difference comprises an increasing frequency sweep over time which represents a first communication symbol value and a decreasing frequency sweep over time which represents a second communication symbol value.

12. A second microwave sensor device as claimed in claim 11, wherein the detector generates orthogonal I and Q intermediate frequency signals.

13. A second microwave sensor device as claimed in claim 8, wherein the microwave transceiver is adapted to transmit a further communications signal to a next microwave sensor device in order to spread the communications signal from the first microwave sensor device,
wherein said further communications signal is for detection at the next microwave sensor device to form a third characteristic difference between the further communications signal and a microwave transmit signal of the next microwave sensor device.

14. A second luminaire, comprising:
a lamp; and
a second sensor device as claimed in claim 8,
wherein the luminaire is adapted to receive a communications signal from one or more adjacent luminaries, wherein the communications signal relates to activity detection information at the adjacent luminaire.

15. A method of detecting activity at a first microwave sensor device and sending a communication to a second microwave sensor device, comprising:
transmitting a microwave transmit signal and receiving a microwave receive signal;
for activity detection at the first microwave sensor device, processing the microwave transmit signal and the microwave receive signal and to detect activity based on first characteristic difference of the microwave transmit signal and the microwave receive signal; and
for communicating with the second microwave sensor device, controlling the microwave transceiver to transmit a communications signal for detection at the second microwave sensor device, said communications signal having a second characteristic difference with respect to a characteristic of a microwave transmit signal of the second microwave sensor device, which second characteristic difference is adapted to be detected by the second microwave sensor device so as to be aware of the communication, wherein said communications signal is adapted to mimic the microwave transmit signal of the second microwave sensor device reflected by a moving object, by having the second characteristic difference equal to the characteristic variation of the characteristic of the microwave transmit signal of the second microwave sensor device caused by the moving object.

* * * * *